Patented May 26, 1931

1,806,690

UNITED STATES PATENT OFFICE

GERHARD KRÖNER, OF COLOGNE-ON-THE-RHINE, AND FRIEDRICH WILHELM STAUF, OF COLOGNE-DEUTZ, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS FOR THE REGENERATION OF ACTIVE SILICA GEL

No Drawing. Application filed July 6, 1928, Serial No. 290,880, and in Germany July 25, 1927.

The present invention concerns the regeneration of active silica gel by removing the impurities therefrom by means of oxidizing agents in the gaseous or liquid phase at a low temperature, advantageously below about 150° C.

When active silica gel is used as a catalyst or adsorbent in organic reactions, it loses its activity and usually assumes a dark color. In order to restore the activity of the silica gel, the absorbed decomposed organic substance has hitherto been burnt away in air or oxygen at a temperature of about 600° C. Such a treatment, however, evidently as the consequence of the necessary high temperature, caused the original activity of the catalyst to be lost or considerably reduced.

In accordance with the present invention oxidation is effected at a moderately low temperature advantageously below about 150° C.; the oxidizing agents are employed in the gaseous or liquid phase, for example, nitric acid, mixtures of nitric acid and sulfuric acid, chlorine water, hydrogen peroxide and the like. After washing and slowly drying in the usual manner, the silica gel, thus treated, exhibits its original activity.

In order to avoid the destruction of the gel during the treatment with the liquid oxidizing agent, it is recommended to effect a preliminary saturation of the silica gel by treatment with steam.

The following examples will illustrate the invention:

*Example 1.*—A specimen of active silica gel, the activity of which has been reduced by carbonization to 15 per cent. of its original value, is covered with concentrated nitric acid and heated to boiling for several hours under a reflux condenser. After filtration and washing, the substance is dried and used again. The activity, as shown by the absorption of benzene, had been restored to its original value.

*Example 2.*—Spent silica gel is heated for several hours with boiling chlorine water, a slow current of chlorine gas being passed through; the silica gel is then filtered, washed and dried. In this case also the original activity is restored.

We claim:
1. In the process for the regeneration of active silica gel which is impregnated with decomposed organic substance, the step which comprises treating the silica gel with a substance of the group comprising liquid and gaseous oxidizing agents at a temperature between about 90° and 150° C.

2. In the process for the regeneration of active silica gel which is impregnated with decomposed organic substances, the step which comprises treating the silica gel with an oxidizing agent in a liquid phase at a temperature between about 90° and 150° C.

3. In the process for the regeneration of active silica gel which is impregnated with decomposed organic substance, the step which comprises boiling the silica gel with concentrated nitric acid for several hours under reflux.

In testimony whereof we have hereunto set our hands.

GERHARD KRÖNER. [L. S.]
FRIEDRICH WILHELM STAUF. [L. S.]